H. F. WOODWARD.

Overalls.

No. 8,617. Reissued Mar. 11, 1879.

Witnesses

Chas. H. Smith

Geo. T. Pinckney

Inventor

Henry F. Woodward for Lemuel W. Serrell

Atty

UNITED STATES PATENT OFFICE.

HENRY F. WOODWARD, OF NEW YORK, N. Y.

IMPROVEMENT IN OVERALLS.

Specification forming part of Letters Patent No. 153,292, dated July 21, 1874; Reissue No. 8,093, dated February 19, 1878: Reissue No. 8,617, dated March 11, 1879; application filed February 3, 1879.

*To all whom it may concern:*

Be it known that I, HENRY F. WOODWARD, of the city and State of New York, have invented an Improvement in Workmen's Overalls, of which the following is a specification:

Children's night-garments have been made with an opening down the back, the waist and drawers being connected together; but a garment of this character is not adapted to workmen, either in appearance or for convenience, because the fastenings are not easily accessible, and are liable to be broken by the movements of the body.

Under-garments to cover the person have been made of buckskin, open down the breast, and with a seam at the waist, and bathing-suits have been similarly made, either with or without a seam at the waist. Bathing-suits have also been made both of knitted and woven material; but the same are not adapted to being worn over other clothing, because the front and back parts of the garment are of the same length, or nearly so; hence, if worn over other clothing, they would prevent the free motion of the body, especially in stooping and reaching forwardly.

Drawers have been made that open down the front to the crotch; but they are in two parts, sewed or buttoned at the waist; and in other instances drawers and bathing-suits have been made in one piece from the shoulders down the fronts; but the backs are the same length as the fronts.

My invention is a new article of manufacture, adapted to covering the usual clothing of the body, legs, and arms, such overalls being made with sleeves and pockets, and cut with the back portions of the garment longer than the front part, so as to allow freedom of motion to all parts of the body, my special peculiarity in this kind of garment being in constructing the front portions of such overalls of one piece of woven fabric, running from the shoulder down to the bottom of the leg, thereby avoiding any seam at the front portion of the garment.

It is well known that the strain and wear come chiefly on this front portion of the garment, and by avoiding any seam at the waist greater strength and durability are obtained than heretofore.

By this construction the entire person is covered with the overall, freedom of movement to the arms and legs is allowed for, the under-garments are kept clean, and the body is protected from cold, especially around the waist.

Figure 1:
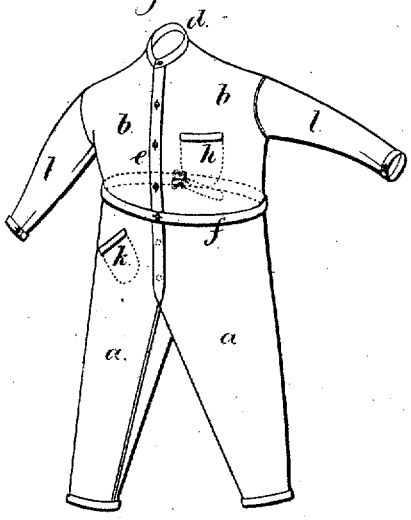
Figure 2:
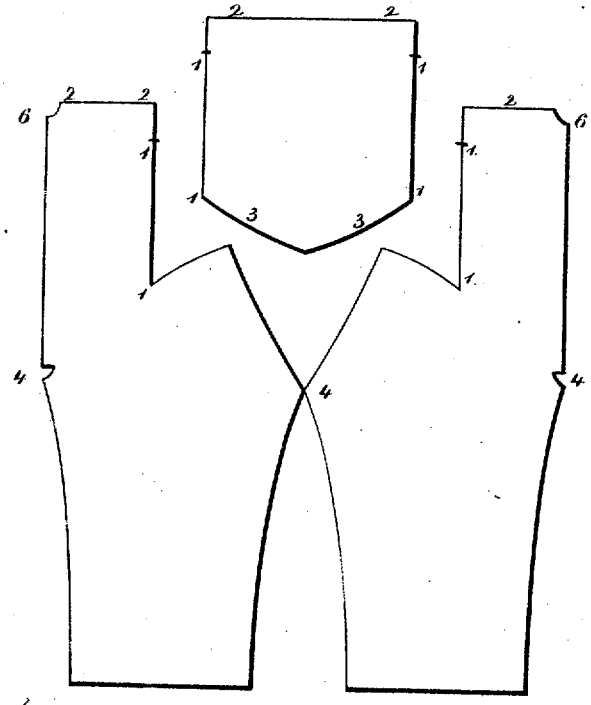

In the drawings, Figure 1 represents, by a perspective view, the said improved overalls. Fig. 2 shows the pattern by which the material may be cut out.

The legs *a* and body *b* are made of suitable flexible material, usually of heavy cotton goods. The same is cut out and joined by seams so as to fit the person.

Fig. 2 illustrates the manner in which the material can be cut out so as to fit the person.

The garment, except the sleeves, is s own as of two main sections, the fabric running from the neck-band *d* to the bottom of the leg portion or drawers *a*, and extending from the front connecting-bands or hems *c* around to the back.

In cases where the back is separated from the side sections, as seen in Fig. 2, the seams will be under the arms at 1 1, upon the shoulders at 2 2, and around the back part of the waist at 3; but the seam may be at the back to unite the two main sections.

Under all circumstances the length at the back from the intersection 4 of the crotch-seam to the collar measures considerably more than the fronts from the intersection 4 to the collar 6, so as to fit the person. The usual proportion will be twenty-six inches fronts from 4 to 6, thirty inches from crotch 4 to shoulder-seam, and thirty-six and a half inches from crotch 4 to collar 6 at back. These will be varied according to the size of the garment; but the relative proportions will remain about as stated.

The waistband *f* is preferably sewed to the fabric at the front and loose at the back, and provided with a buckle. This waistband serves to gather the garment about the person at the waist, and painters can carry a dusting-brush at the back.

I prefer buttons and button-holes for fastening the garment together down the front. The pockets *h* and *k* are inserted at each side of the front opening. The sleeves *l* are of the character used in workmen's jackets.

The overalls made in this manner is a new and very useful article of manufacture.

I claim as my invention—

As a new article of manufacture, the workmen's overalls open down the front to the crotch, or nearly so, provided with sleeves, pockets, and waistband, and in which the woven fabric of the front of the garment extends in one piece from the shoulder to the bottom of the leg, so as to avoid a seam at the front of the waist, and the backs are longer than the front, so as to allow freedom of movement, substantially as set forth.

Signed by me this 27th day of January, A. D. 1879.

HENRY F. WOODWARD.

Witnesses:
GEO. T. PINCKNEY,
CHAS. H. SMITH.